(12) United States Patent
Kwapich

(10) Patent No.: US 8,955,429 B2
(45) Date of Patent: Feb. 17, 2015

(54) INTERMEDIATE BRACING SUPPORT AND GUIDE FOR USE WITH AN ELONGATED EGG CRACKER SHAFT AND FOR PREVENTING OUTWARD BOWING DEFLECTION DURING EGG DELIVERY AND BREAKING OPERATIONS

(71) Applicant: FPS Food Processing Systems, B.V., Re Nootdrop (NL)

(72) Inventor: Steve Kwapich, Lambertville, MI (US)

(73) Assignee: FPS Food Processing Systems, B.V., Re Nootdrop (NL)

( * ) Notice: Subject to any disclaimer, the term of this patent is extended or adjusted under 35 U.S.C. 154(b) by 296 days.

(21) Appl. No.: 13/657,925

(22) Filed: Oct. 23, 2012

(65) Prior Publication Data

US 2013/0104752 A1 May 2, 2013

Related U.S. Application Data

(60) Provisional application No. 61/552,137, filed on Oct. 27, 2011.

(51) Int. Cl.
*A47J 43/14* (2006.01)
*A23J 1/09* (2006.01)

(52) U.S. Cl.
CPC . *A47J 43/145* (2013.01); *A23J 1/09* (2013.01)
USPC .................... 99/500; 99/497; 99/578; 99/582

(58) Field of Classification Search
CPC ................................ A47F 43/145; A23J 1/09
USPC ........... 99/500, 499, 498, 497, 571, 577, 578, 99/581, 582
See application file for complete search history.

(56) References Cited

U.S. PATENT DOCUMENTS

| | | | |
|---|---|---|---|
| 2,760,536 A | 8/1956 | Willsey |
| 3,448,782 A | 6/1969 | Williams |
| 3,958,505 A | 5/1976 | Baker |
| 4,137,838 A | 2/1979 | Warren |

(Continued)

FOREIGN PATENT DOCUMENTS

| | | |
|---|---|---|
| WO | 8905097 A1 | 6/1989 |
| WO | 9208402 A1 | 5/1992 |
| WO | 2007095943 A1 | 8/2007 |

*Primary Examiner* — Reginald L Alexander
(74) *Attorney, Agent, or Firm* — Gifford, Krass, Sprinkle, Anderson & Citkowski, P.C.; Douglas J. McEvoy

(57) ABSTRACT

A support mechanism for preventing outward deflection of a cracker shaft in an egg breaker assembly, about which are supported in orbiting fashion a plurality of circumferentially spaced rows of egg breakers. A disk shaped portion is mounted in slaved rotatable fashion about an intermediate location of the cracker shaft and exhibits a plurality of exteriorly facing and circumferentially offset inwardly recessed scalloped surfaces. An outer fixed and guiding cam is secured to an aligning intermediate location of the breaker and exhibits an inner arcuate extending and guiding/support surface in outwardly spaced and aligning fashion relative to the scalloped locations of the rotating disk. A perimeter support is disposed upon an aligning location of each cracker shaft and which is captured between selected scalloped locations and the inner guide supporting surface corresponding to at least one of egg receipt, breaking and depositing of yolk and albumen contents to synchronized delivery cups and albumen trays associated with the breakers.

13 Claims, 4 Drawing Sheets

(56) References Cited

U.S. PATENT DOCUMENTS

| | | |
|---|---|---|
| 4,321,864 A | 3/1982 | Willsey |
| 4,534,284 A | 8/1985 | Fujimura et al. |
| 4,605,562 A | 8/1986 | Fujimura et al. |
| 4,961,946 A | 10/1990 | Shimizu |
| 5,085,139 A | 2/1992 | Pellegrinelli |
| 5,197,380 A | 3/1993 | Fisher |
| 5,613,429 A | 3/1997 | Pettazzi |
| 5,628,246 A | 5/1997 | Kristensen |
| 5,634,397 A | 6/1997 | Hutchinson et al. |
| 5,858,434 A | 1/1999 | Thomas |
| 7,377,211 B1 * | 5/2008 | Savage et al. .......... 99/571 |
| 7,637,374 B2 | 12/2009 | Fried |
| 8,739,695 B2 * | 6/2014 | Kristensen et al. .......... 99/500 |

\* cited by examiner

INTERMEDIATE BRACING SUPPORT AND GUIDE FOR USE WITH AN ELONGATED EGG CRACKER SHAFT AND FOR PREVENTING OUTWARD BOWING DEFLECTION DURING EGG DELIVERY AND BREAKING OPERATIONS

CROSS REFERENCE TO RELATED APPLICATIONS

The present application claims the priority of U.S. Ser. No. 61/552,137 filed Oct. 27, 2011.

FIELD OF THE INVENTION

The present invention discloses a support brace arranged at a generally intermediate location of an egg cracker shaft associated with an egg transfer assembly including at least a breaker operation and in which the shaft and other components are widened (laterally elongated) in order to accommodate a greater number of egg conveying lanes associated with higher processing volume. Use of the support and guide obviates the need for prior art remedies for addressing shaft flexing, such as which have included supporting the shaft in a single direction or separating into separately driven and supported halves. In operation, the intermediate bracing support prevents flexing of an otherwise unsupported and widened cracker shaft, the critical aspects of which are needed during a repeating subset range of rotation of the multiple egg breakers extending from the cracker shaft and which correspond to egg delivery and breaking sub-operations.

BACKGROUND OF THE PRIOR ART

The prior art is documented with examples of egg processing and transfer machinery, such as for example that depicted in the automatic egg shelling machine depicted in U.S. Pat. No. 5,085,139, to Pelbo. Additional examples of prior art egg processing machines incorporating some form of egg breaker (or cracker) units includes such as is depicted in, U.S. Pat. No. 5,858,434 to Thomas, U.S. Pat. No. 5,628,246 to Kristensen, and U.S. Pat. No. 5,613,429, to Pettazzi.

SUMMARY OF THE PRESENT INVENTION

The present invention discloses a support mechanism integrated into an egg breaker assembly for preventing outward deflection of an associated cracker shaft, about which are supported in orbiting fashion a plurality of circumferentially spaced rows of egg breakers. Features associated with the support mechanism include the provision of a disk shaped portion mounted in slaved rotatable fashion about an intermediate location of the cracker shaft.

The disk exhibits a plurality of exteriorly facing and circumferentially offset inwardly recessed scalloped surfaces. An outer fixed and guiding cam is secured to an aligning intermediate location of the breaker. The cam exhibits an inner arcuate extending and guiding/support surface in outwardly spaced and aligning fashion relative to the scalloped locations of the rotating disk.

A generally arcuate perimeter shaped support is disposed upon an aligning location of each cracker shaft and which is captured between a selected one of the scalloped locations and the inner guide supporting surface, this through a subset arcuate range corresponding to at least one of egg receipt, breaking and depositing of yolk and albumen contents to synchronized delivery cups and albumen trays associated with the breakers. The perimeter shaped support may further include an outer radial edge matching a radius exhibited by the inner arcuate support surface associated with the outer fixed and guiding cam.

Additional features include the inner facing guide surface extending from a range equal or less than 180° between an uppermost spool bar receipt location to a lower-most yolk and albumen depositing location. The rotating disk and fixed cam each further have a durable and non-corrosive material. Other features include an approximately twelve o clock entry location and an approximately six o clock exit location configured into the rotating disk, between which occur egg receipt, breaking and depositing.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring to FIGS. 1-4, the present invention again discloses a support brace arranged at a generally intermediate location of an egg cracker shaft associated with an egg transfer assembly including at least a breaker operation, and in which the shaft and other components are widened (laterally elongated) in order to accommodate a greater number of egg conveying lanes associated with higher processing volume. As further described, the support and guide prevents flexing of an otherwise unsupported and widened cracker shaft, the critical aspects of which are needed during a repeating subset range of rotation of the multiple egg breakers extending from the cracker shaft and corresponding to egg delivery and breaking.

Figure 1:
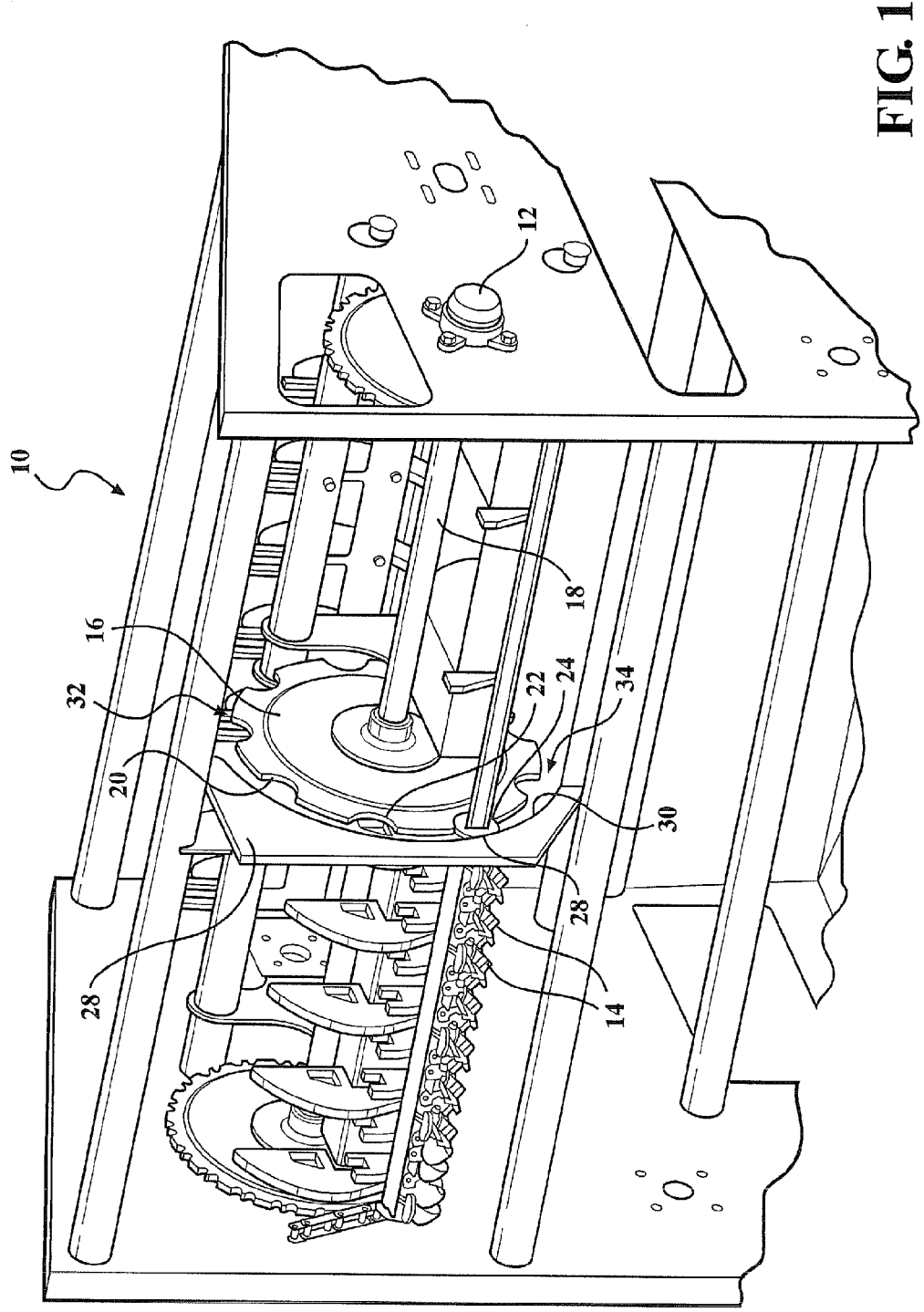
FIG. 1 is a perspective illustration of a breaker subsystem such as which is incorporated into an egg transfer operation and further illustrating, with the removal of associated spool bars and specified components, features including the first disc shaped portion extending about the midpoint of the cracker shaft, in combination with the disk exhibiting outer circumferential extending scalloped cutouts in cooperation with a fixed and forward/outer guide (cam) surface, and such that the forward mounted cam surface defines the critical subset rotational range during which deflection of the cracker shaft is to be avoided and, in cooperation with the spacing established with the rotating scalloped cutouts in the disk, operating to sandwich and guide a midpoint location of each of a plurality of circumferentially spaced outer breaker shafts coaxially orbiting around the central cracker shaft, thereby maintaining the middle most egg breakers in a fashion intended to ensure proper egg delivery and breaking into the respective yolk cups and albumen trays.
Figure 2:
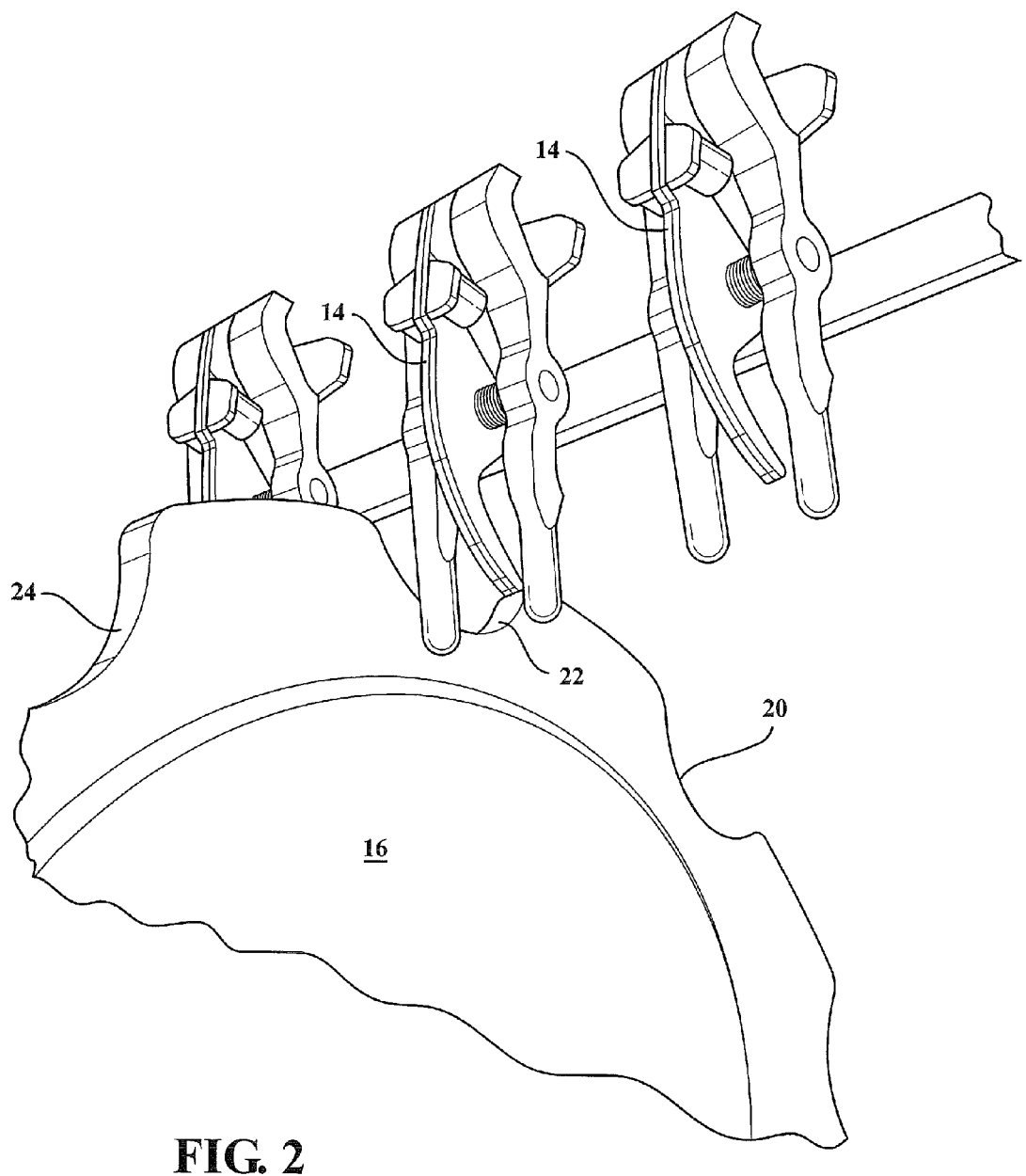
FIG. 2 is an enlarged sectional perspective of the cracker bar at a first specified position approximate to the twelve o clock position of FIG. 1.

Referring again to FIG. 1, a perspective illustration is generally shown at 10 of a breaker subsystem such as which is incorporated into an egg transfer operation and which, for purposes of ease of illustration, includes the removal of associated spool bars nominally at an elevated location, which attend to the delivery of the eggs to dedicated breaker subassemblies which are known according to the art and which extend in radially spaced rows from a central cracker shaft 12. Also not depicted for purposes of ease and clarify of illustration of the center support brace are the pluralities of yolk receiving cups and albumen trays, these being typically supported in a closed loop conveyor and advanced in synchronizing fashion with the advancing of the eggs on the delivery spool bars as well as the counterclockwise (as depicted in FIG. 1) advancement of the egg breaker subassemblies (see selected breakers associated with radially offset row 14) from a first (elevated) receiving location relative to the spool delivery bars (again removed) to a second delivery location for expelling the yolk and albumen contents of each egg into a specified yolk cup and underneath located and drain through albumen collection tray.

For purposes of the present invention, the configuration and construction of the above described features of the spool bars, egg breakers and yolk cups/albumen trays are asserted to be, by themselves, fairly well known and such that additional description and/or illustration thereof is unnecessary. In this manner, the pertinent features of the intermediate located and arcuate extending guide and support forming a part of the present invention are better depicted and explained and for assisting in preventing undesirable bowing or deflection of an otherwise unsecured midpoint location of a lengthened cracker shaft, such as which is subject to the mid-most located rows of breakers, and which can be of particular concern during the subset rotary cycle encompassing spool bar egg receipt and breaking/delivery to synchronized and lower located yolk cups/albumen trays.

The above said, and referring again to FIG. 1, associated components of the intermediate located central axial support and guide include a first generally disc shaped portion 16 which is mounted about a generally mid location of a central rotating cracker shaft 18 associated with the breaker operation. As shown, the disc 16 (which can include any type of durable and non-corrosive material such as without limitation any of an Acetal based material, heavy duty nylon or other material). The disc 16 as depicted further exhibits a plurality of outer circumferential spaced apart and extending scalloped cutouts, see at 20, 22, 24 et seq., extending 360° about an outer rim of the disc 16.

Without further explanation, the angularly spaced arrangement of the scalloped cutouts corresponding to the radially offset and outer coaxial supporting locations of the individual rows of breakers. This is representatively depicted at 14 and which includes a generally arcuate exterior perimeter shaped (shown as circular) support 26 mounted at a midpoint location of the breaker support shaft 14 which aligns and seats within a selected scalloped location 24.

An outer fixed and guiding cam surface (such as also constructed of a heavy duty nylon, polymeric or other suitable material) is further illustrated at 28 and is secured to an aligning midpoint location of the breaker such that an inner arcuate extending and guiding/support surface 30 is aligned in outwardly/opposingly spaced manner relative to the exterior facing scalloped recesses or cutouts 20, 22, 24, et seq. of the cracker shaft mounted and rotating disc 16. As shown in FIG. 1, the inner arcuate profile 30 of the cam surface generally corresponds to an angular range equal or less than 180° extending from an uppermost, generally twelve o'clock entering position, generally depicted at 32, relative to the counter clockwise rotating (as viewed in FIG. 1) direction of the disk 16, to an exiting substantially six o'clock position, generally at 34, as further shown.

The circular support 26 arranged on the outer parallel and coaxial orbiting shaft supporting the breakers 14 likewise is dimensioned to contact the inner arcuate surface 30 of the fixed cam surface 28 such that, in combination with the inner scalloped locations of the rotating disk 16, operate over the dedicated rotational range to prevent undesirable outward bowing or flexing of the cracker shaft 18 over the critical subset arcuate range corresponding to a series of egg delivery and breaking operations. As depicted in succeeding illustrations FIGS. 2-4, these include a first specified egg receipt location approximate to the twelve o clock position (FIG. 2) corresponding to delivery from the spool bars to the individual and plural circumferentially spaced breaker rows (again only one of which is shown in FIG. 1). Although not shown in FIG. 1, it is further understood that each additional and orbiting breaker support (i.e. cracker) shaft includes an identical shaped support 26 which acts to maintain the relative positioning of the supported breakers relative to the cracker shaft 12 and in response to a tendency of an otherwise unsupported shaft 12 to outwardly bow or deflect.

Figure 3:
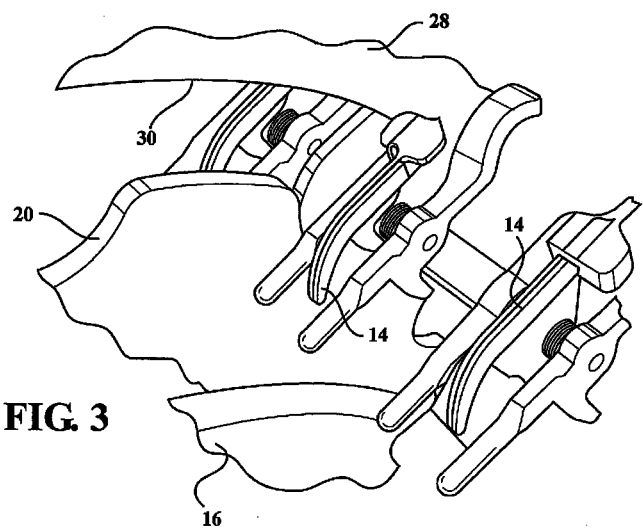
FIG. 3 is a succeeding perspective of the cracker bar at a counterclockwise advanced approximate eleven o clock position of the central bracing support approximating an egg delivery location to an associated breaker.
Figure 4:
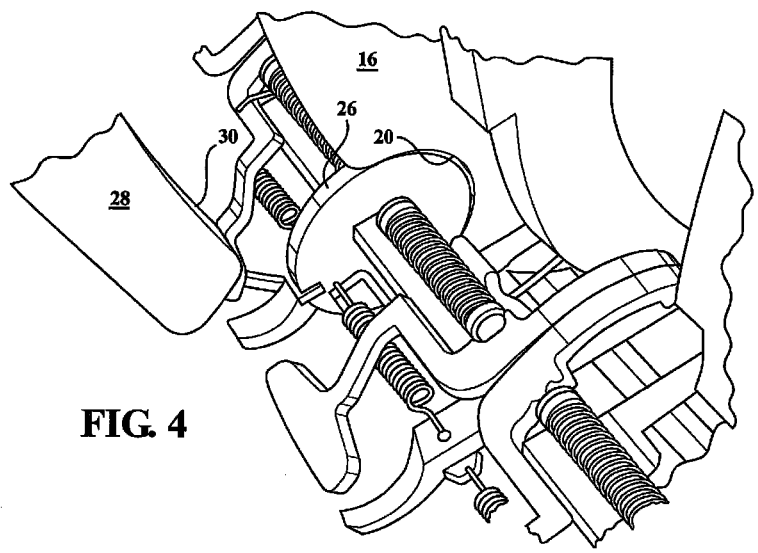
FIG. 4 is a further succeeding perspective of the cracker bar at an approximate six o clock position following egg delivery and breaking, such as into associated pairs of yolk cups and albumen trays, and in which the cracker bar is disengaged from the central support shaft.

FIG. 3 is a succeeding perspective of the cracker bar at a counterclockwise advanced approximate eleven o clock position of the central bracing support and approximating an egg delivery location to an associated breaker. FIG. 4 is a further succeeding perspective of the cracker bar at an approximate six o clock position following egg delivery and breaking, such as into associated pairs of yolk cups and albumen trays, and in which the cracker bar is disengaged from the central support shaft.

Figure 5:
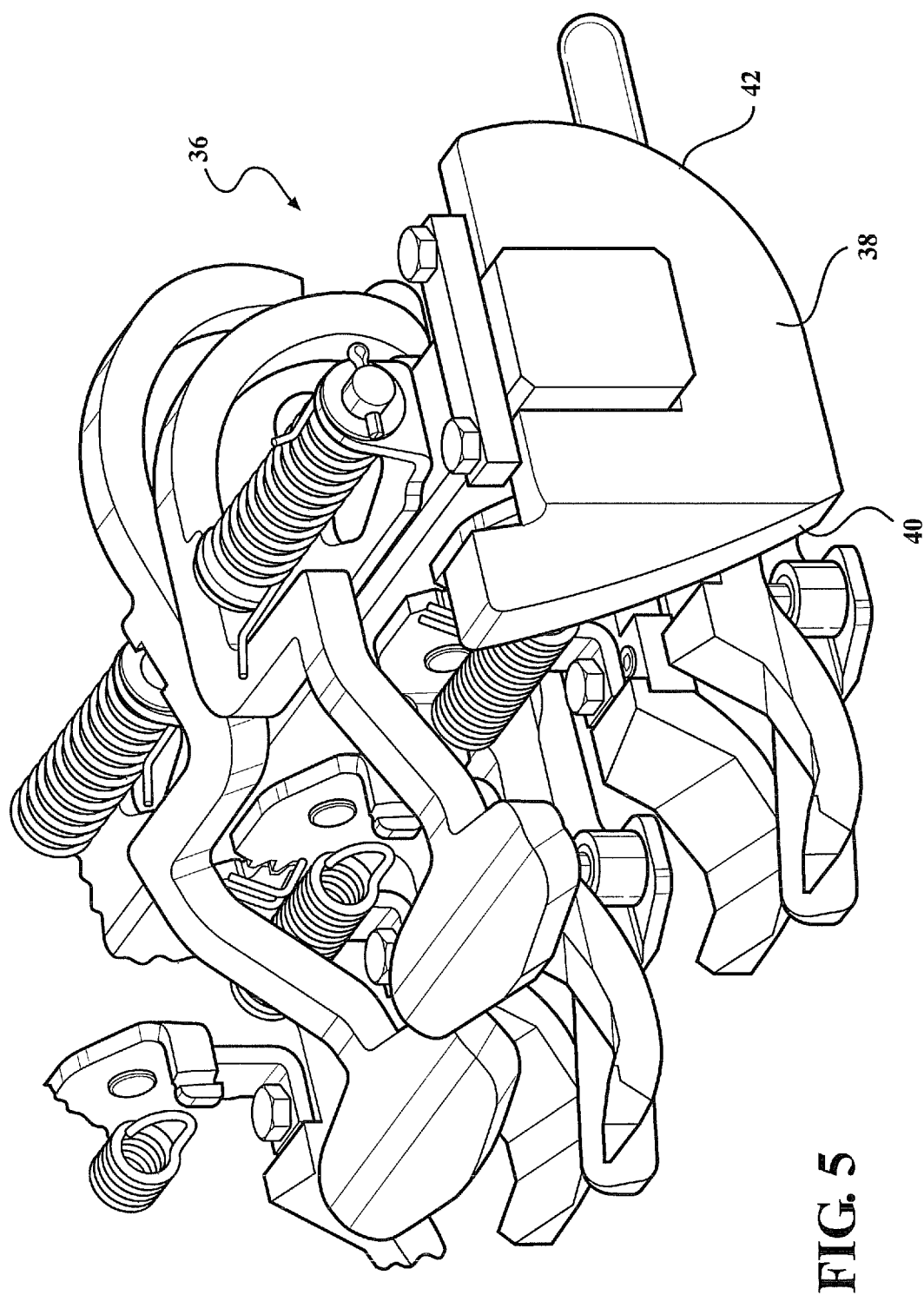
FIG. 5 is a sectional perspective of an alternately configured guide profile associated with a selected cracker bar and which includes an outer radial curved surface which matches a radius associated with an inner arcuate profile of the outer fixed and guiding cam surface.

Referring finally to FIG. 5, a sectional perspective is generally shown at 36 of an alternately configured guide or support profile 38 associated with a selected cracker bar, as compared to the generally circular shape associated with the support 26 described in FIG. 4. The support 38 exhibits, in relevant part, an outer radial curved surface 40 which matches an identical radial curve associated with the inner arcuate profile 30 of the outer fixed and guiding cam 28. Upon the cracker bar depicted in FIG. 5 being installed in a manner similar to the alternate variant of FIG. 4 the support profile 38 is aligned so that a further arcuate edge 42 seats within a selected semi-circular (scalloped) cutout 20, 22, 24 et seq., while the opposite outer radial edge 40 seamlessly guides along the matching inner radial surface 30 of the outer fixed cam guide 28.

As previously described, the necessity of designing wider cracker shafts corresponds to the incorporation of wider spool bars for increasing a number widthwise egg delivery lanes to the breakers, the result of which has previously resulted in inadequate bracing or support at the midpoint location of the rotating cracker shaft resulting in uneven egg delivery and/or breaking. In this manner, the present invention is intended to eliminate the undesirable flexing/bowing of the cracker shaft at the midpoint location, thereby maintaining the middle most egg breakers in a fashion intended to ensure proper egg delivery and breaking into the respective yolk cups and albumen trays.

Having described my invention, other and additional preferred embodiments will become apparent to those skilled in the art to which it pertains, and without deviating from the scope of the appended claims:

I claim:

1. A support mechanism integrated into an egg breaker and for preventing outward deflection of an associated cracker shaft about which are supported in orbiting fashion a plurality of circumferentially spaced rows of egg breakers, said mechanism comprising:
    a disk shaped portion mounted in slaved rotatable fashion about an intermediate location of the cracker shaft, said disk exhibiting a plurality of exteriorly facing and circumferentially offset inwardly recessed scalloped surfaces;
    an outer fixed and guiding cam secured to an aligning intermediate location of the breaker, said cam exhibiting an inner arcuate extending and guiding/supporting surface in outwardly spaced and aligning fashion relative to said scalloped locations of said rotating disk; and
    a generally arcuate perimeter shaped support disposed upon an aligning location of each cracker shaft and which is captured between a selected one of said scalloped locations and said inner guide supporting surface through a subset arcuate range corresponding to at least one of egg receipt, breaking and depositing of yolk and albumen contents to synchronized delivery cups and albumen trays associated with the breakers.

2. The mechanism as described in claim 1, said inner facing guide surface extending from a range equal or less than 180° and between an uppermost spool bar receipt location to a lower-most yolk and albumen depositing location.

3. The mechanism as described in claim 1, said rotating disk and fixed cam each further comprising a durable and non-corrosive material.

4. The mechanism as described in claim 2, further comprising a twelve o clock entry location and a further six o clock exit location, between which occur egg receipt, breaking and depositing.

5. The mechanism as described in claim 1, said perimeter shaped support further comprising an outer radial edge matching a radius exhibited by said inner arcuate support surface associated with said outer fixed and guiding cam.

6. A support mechanism integrated into an egg breaker and for preventing outward deflection of an associated cracker shaft about which are supported in orbiting fashion a plurality of circumferentially spaced rows of egg breakers, said mechanism comprising:
    a disk shaped portion mounted in slaved rotatable fashion about an intermediate location of the cracker shaft, said disk exhibiting a plurality of exteriorly facing and circumferentially offset inwardly recessed scalloped surfaces;
    an outer fixed and guiding cam secured to an aligning intermediate location of the breaker, said cam exhibiting an inner arcuate extending and guiding/supporting surface in outwardly spaced and aligning fashion relative to said scalloped locations of said rotating disk; and
    a generally arcuate perimeter shaped support disposed upon an aligning location of each cracker shaft and which is captured between a selected one of said scalloped locations and said inner guide supporting surface through a subset arcuate range corresponding to at least one of egg receipt, breaking and depositing of yolk and albumen contents to synchronized delivery cups and albumen trays associated with the breakers, said perimeter shaped support further comprising an outer radial edge matching a radius exhibited by said inner arcuate support surface associated with said outer fixed and guiding cam.

7. The mechanism as described in claim 6, said inner facing guide surface extending from a range equal or less than 180° and between an uppermost spool bar receipt location to a lower-most yolk and albumen depositing location.

8. The mechanism as described in claim 6, said rotating disk and fixed cam each further comprising a durable and non-corrosive material.

9. The mechanism as described in claim 7, further comprising a twelve o clock entry location and a further six o clock exit location, between which occur egg receipt, breaking and depositing.

10. A support mechanism integrated into an egg breaker and for preventing outward deflection of an associated cracker shaft about which are supported in orbiting fashion a plurality of circumferentially spaced rows of egg breakers, said mechanism comprising:
    a disk shaped portion mounted in slaved rotatable fashion about an intermediate location of the cracker shaft, said disk exhibiting a plurality of exteriorly facing and circumferentially offset inwardly recessed scalloped surfaces;
    an outer fixed and guiding cam secured to an aligning intermediate location of the breaker, said cam exhibiting an inner arcuate extending and guiding/supporting surface in outwardly spaced and aligning fashion relative to said scalloped locations of said rotating disk;
    said inner facing guide surface extending from a range of around 180° and between an uppermost spool bar receipt location to a lower-most yolk and albumen depositing location; and
    a generally arcuate perimeter shaped support disposed upon an aligning location of each cracker shaft and which is captured between a selected one of said scalloped locations and said inner guide supporting surface through a subset arcuate range corresponding to at least one of egg receipt, breaking and depositing of yolk and albumen contents to synchronized delivery cups and albumen trays associated with the breakers.

11. The mechanism as described in claim 10, said rotating disk and fixed cam each further comprising a durable and non-corrosive material.

12. The mechanism as described in claim 11, further comprising a twelve o clock entry location and a further six o clock exit location, between which occur egg receipt, breaking and depositing.

13. The mechanism as described in claim 10, said perimeter shaped support further comprising an outer radial edge matching a radius exhibited by said inner arcuate support surface associated with said outer fixed and guiding cam.

\* \* \* \* \*